US005381011A

United States Patent [19]

Sandell et al.

[11] Patent Number: 5,381,011
[45] Date of Patent: Jan. 10, 1995

[54] MOTION DETECTOR WITH TWO-SIDED PIR SENSOR IN REFRACTIVE ARRANGEMENT

[75] Inventors: Donald R. Sandell, San Jose; Wade P. Lee, Lafayette, both of Calif.

[73] Assignee: Intelectron Products Company, Hayward, Calif.

[21] Appl. No.: 180,610

[22] Filed: Jan. 12, 1994

[51] Int. Cl.$^6$ ................................................. G01J 5/08
[52] U.S. Cl. ..................................... 250/353; 250/342; 250/DIG. 1
[58] Field of Search .................. 250/342, 353, DIG. 1

[56] References Cited
U.S. PATENT DOCUMENTS

| | | | |
|---|---|---|---|
| 5,124,546 | 6/1992 | Hu | 250/216 |
| 5,200,624 | 4/1993 | Pederson, Jr. et al. | 250/342 |
| 5,308,985 | 5/1994 | Lee | 250/342 |

*Primary Examiner*—Carolyn E. Fields
*Attorney, Agent, or Firm*—Elliot B. Aronson

[57] ABSTRACT

A passive infrared motion detector with a 360° field of view. The motion detector includes an integrated-circuit infrared sensor package containing an infra-red sensor having one or more sensing elements. The integrated-circuit sensor package is provided with viewing windows on both sides and the sensing elements are mounted within the integrated-circuit package so that both sides of the sensing elements are able to receive infrared radiation through the viewing windows from the areas in front of and behind the integrated-circuit package. The motion detector includes infrared-refracting means that are disposed with respect to the front and rear surfaces of the sensing elements so as to direct radiation to the surfaces from lateral areas on both sides of the integrated-circuit package. The infrared refracting means are positioned to leave at least a portion of the surfaces on both sides of the sensing elements unobstructed for receiving infrared radiation directed at the respective unobstructed portions from the frontal and rear regions of the field of view. A focusing means is provided to direct infra-red radiation from a plurality of zones in the frontal and rear regions of the field of view directly to the unobstructed portions of the sensing elements and from a plurality of zones in both lateral regions of the field of view to the refracting means for refraction to the sensing elements.

5 Claims, 2 Drawing Sheets

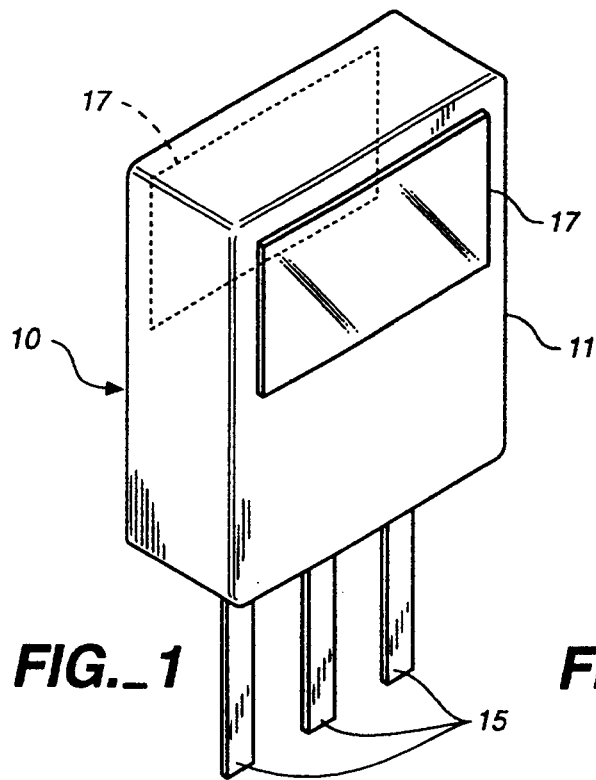
FIG._1
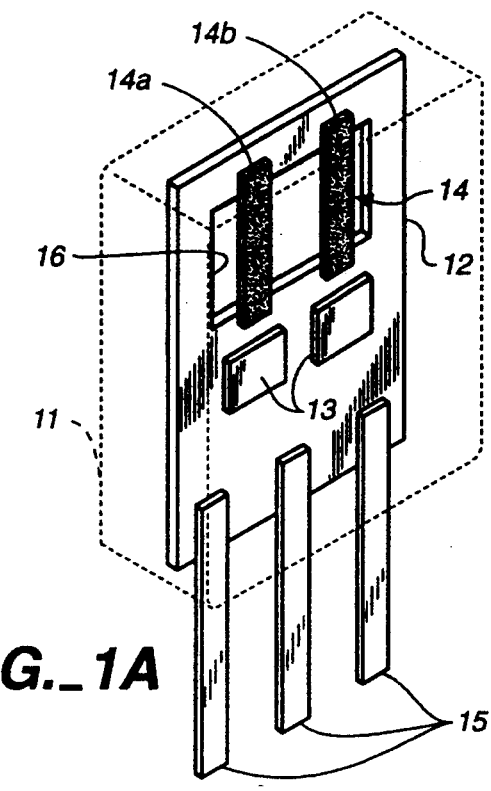
FIG._1A
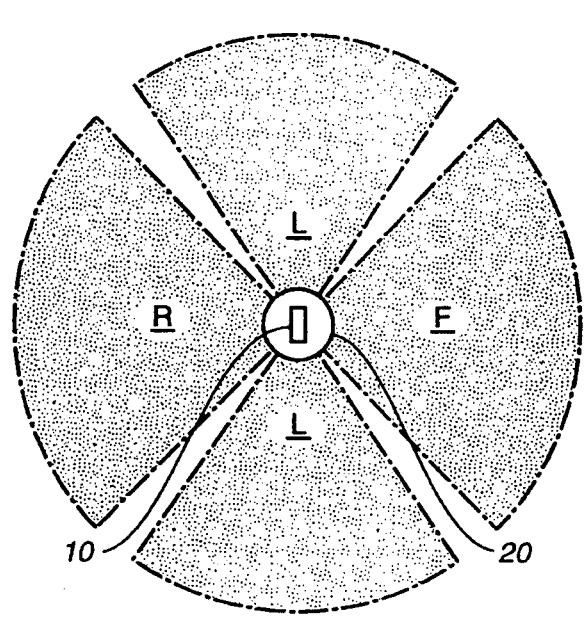
FIG._2
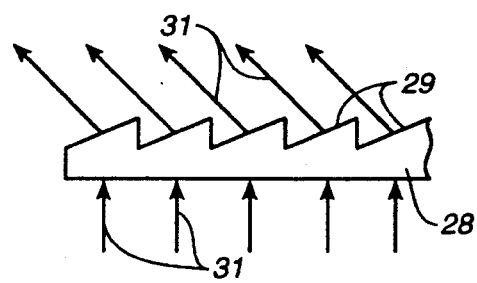
FIG._4

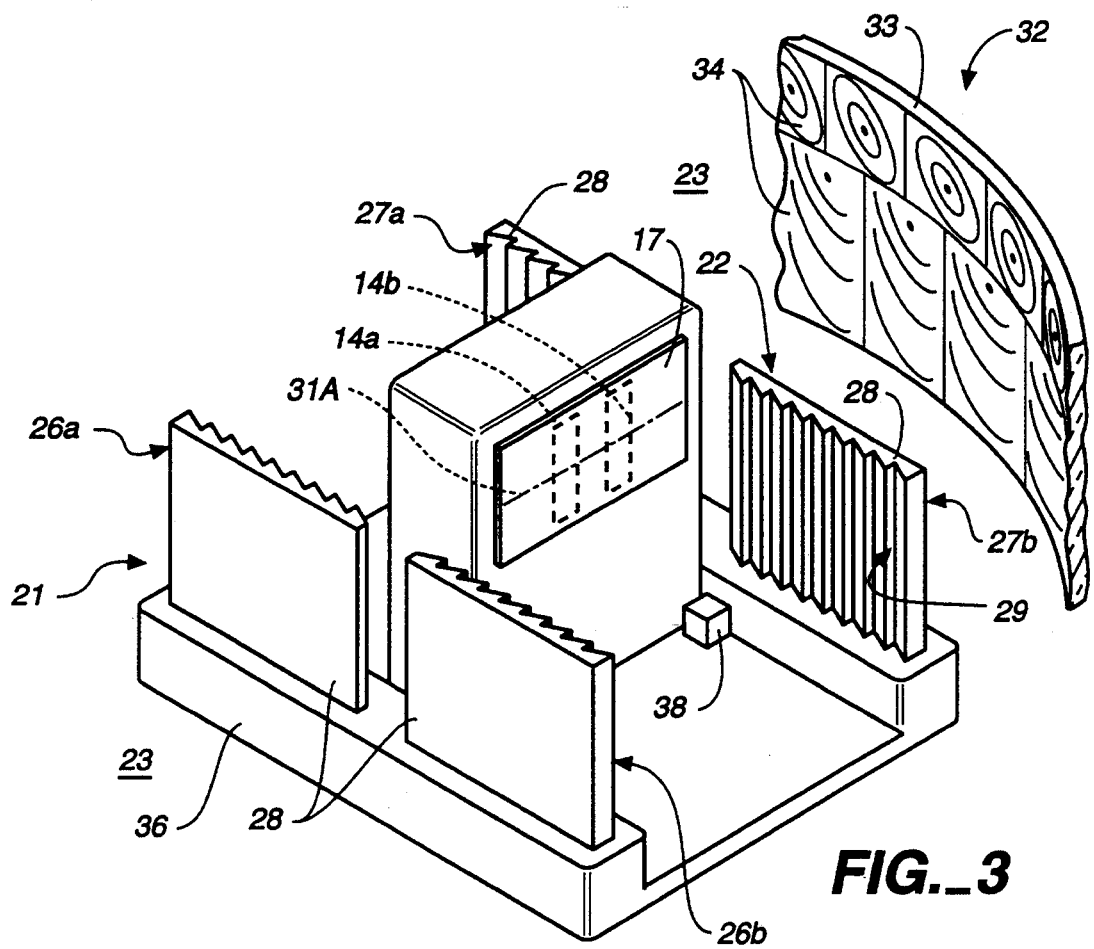
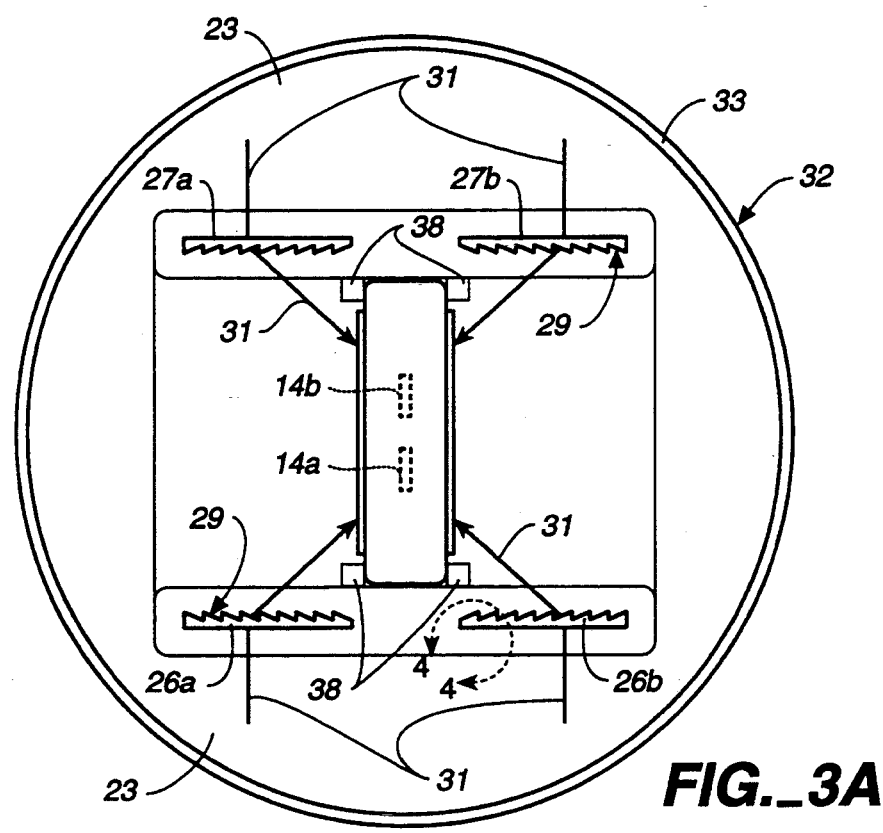
FIG._3
FIG._3A

MOTION DETECTOR WITH TWO-SIDED PIR SENSOR IN REFRACTIVE ARRANGEMENT

BACKGROUND OF THE INVENTION

The present invention relates to passive infrared motion detection devices and is particularly directed to optical arrangements for achieving a wide field of view.

Infrared motion detection devices are commonly used in automatic light switches and security systems to turn on a light or to activate some other form of alarm or warning indicator when a person or motor vehicle enters a monitored area. Such devices may be used in residential lighting, for example, to illuminate a walkway as a person approaches the front door or to illuminate a driveway as a car approaches. They are also popular as energy saving devices in large office buildings or industrial plants, which may have hundreds of rooms to be illuminated day and night. The motion detection devices can save considerable energy and cost by automatically extinguishing the lights in unoccupied rooms.

The devices function by sensing heat, in the form of infra-red radiation, emanating from a person or similarly warm object as the person or object enters or moves about in the field of view of the device. An arrangement of mirrors and/or lenses directs the incident infra-red radiation to a sensor assembly that may include one or more sensors. When the sensor assembly detects an appropriate heat impulse, the device provides an electrical signal to activate the light or other alarm. A common configuration includes an array of individual lenslets, in which each lenslet focuses infra-red radiation from a particular spatial zone of limited extent to one or more sensors. The field of view of the motion detector is the region of space spanned by the totality of these zones. It is by means of these zones that the motion detector is able to detect motion. In a simple embodiment the motion detector turns on a light or provides other indication whenever a person or other warm object enters a single zone. In more complex embodiments the motion detector can be configured to turn on the light only when the warm object sequentially enters and exits a specified number of zones. In this way the motion detector detects movement within its field of view by detecting the heat from the moving object as it enters and exits one or more individual zones in the field of view. The light is typically turned off automatically if no movement is detected within a specified time interval.

Motion detectors for monitoring a full 360° field of view present their own characteristic problems. The passive infrared (PIR) sensor found in popular integrated-circuit (IC) packages does not lend itself well to achieving wide fields of view. These integrated-circuit sensor packages typically include one or more planar sensing elements which are irradiated through a window on the surface of the IC package. These IC sensor packages are most sensitive to head-on radiation, incident at 90° to the window surface. Their sensitivity drops off the more the incident radiation approaches the sensor from the side, i.e., the more the radiation approaches the sensor at a glancing angle. To achieve a wide field of view, known motion detectors generally require complicated optical arrangements for directing the infrared radiation from the outlying reaches of the desired field of view into the significantly narrower angular reach of the sensor sensitivity. Some motion detectors have achieved wider fields of view by compounding a plurality of integrated-circuit sensor packages, each having its own limited field of view, with optical arrangements that bring the incident radiation to the proper sensor at the proper angle to be perceived. In any event motion detectors with wide fields of view have generally involved a tradeoff among increases in cost, complexity, and the physical size of the motion detector unit, and a compromise in performance. For motion detectors approaching a full 360° field of view the tradeoff is all the more stringent.

SUMMARY OF THE INVENTION

The present invention provides a passive infrared motion detector with a field of view up to 360° significantly overcoming the above tradeoff. The invention achieves this result by employing optical arrangements taking advantage of an integrated-circuit sensor package having two windows on opposite sides for viewing the sensing elements in the package from either side.

Briefly, a passive infrared motion detector according to the invention includes an integrated-circuit infrared sensor package containing an infrared sensor having one or more sensing elements. The integrated-circuit sensor package is provided with viewing windows on both sides and the sensing elements are mounted within the integrated circuit package so that both sides of the sensing elements are able to receive infrared radiation through the viewing windows from the areas in front of and behind the integrated-circuit package. The motion detector includes infrared-refracting means that are disposed with respect to the front and rear surfaces of the sensing elements so as to direct radiation to the surfaces from lateral areas on both sides of the integrated-circuit package. The infrared refracting means are positioned to leave at least a portion of the surfaces on both sides of the sensing elements unobstructed for receiving infrared radiation directed at the respective unobstructed portions from the frontal and rear regions of the field of view. A focusing means is provided to direct infrared radiation from a plurality of zones in the frontal and rear regions of the field of view directly to the unobstructed portions of the sensing elements and from a plurality of zones in both lateral regions of the field of view to the refracting means for refraction in the direction of the sensing elements.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a perspective view of an integrated-circuit infrared sensor package for use with the invention.

FIG. 1A is a perspective view showing the interior construction of the integrated-circuit sensor package of FIG. 1.

FIG. 2 is a pattern diagram showing the area encompassed by the field of view of a motion detector according to the invention.

FIG. 3 is a perspective view of a first embodiment of the invention.

FIG. 3A is a plan view of the embodiment of FIG. 3.

FIG. 4 is a close-up plan view of a detail of the refraction means from FIG. 3A.

DETAILED DESCRIPTION OF ILLUSTRATIVE EMBODIMENTS

FIGS. 1 and 1A show an embodiment of an integrated-circuit infrared sensor package used in the invention to achieve a full 360° field of view. The package, indicated generally at reference numeral 10, includes a casing 11 having a shape known generally as a "flat pack." Within casing 11 is a substrate 12 on which the integrated-circuit control electronics, indicated generally at 13, is formed. Substrate 12 also carries an infrared sensor 14. The sensor illustrated in FIGS. 1 and 1A consists of a pair of sensing elements 14a and 14b responsive to incident infrared radiation, but appropriate integrated-circuit packages may be formed with only one or with more than two sensing elements. Leads 15 protrude from the casing for connecting the package in an electronic circuit on a printed circuit board. The construction of a flat pack integrated-circuit infrared sensor package having sensing elements as described thus far is conventional. A two-sensing-element package meeting the description thus far has been commercially marketed, for example, by Amperex Electronic Corporation of Smithfield, R.I., a North American Philips Company, as the Model No. KRX-10 and KRX-11 series.

The integrated-circuit package of FIGS. 1 and 1A goes beyond the conventional sensor packages such as the Amperex KRX-10 or -11 in that here substrate 12 is formed with an aperture 16 and the sensing elements 14a and 14b are suspended across the aperture. Sensing elements for the common integrated-circuit sensors are formed of a material that generates an electrical response when it receives infrared radiation. The electrical response is generated when the incident radiation impinges upon the sensing element from either side. Suspending the sensing elements across aperture 16 permits them to receive radiation from the area in front of and behind the integrated-circuit package. Casing 11 is formed with windows 17 on opposite walls of the IC package to expose the front and rear surfaces of the sensing elements to incident infrared radiation. The opposite walls are generally referred to herein as the front and rear walls and reference will be made herein to the area in front of and behind the package, meaning the area by the front or rear walls, respectively. Since the illustrated embodiment is approximately symmetrical with respect to front and rear, the terms "front" and "rear" are used merely as labels for ease of reference only and no structural distinction is necessarily implied thereby. Thus, the "front" and "rear" surfaces may actually face "side to side" with respect to the motion detector housing in which the IC package is enclosed or with respect to the orientation in which the motion detector is installed.

FIG. 2 shows a diagrammatic view of the area covered by the field of view achievable with a motion detector according to the invention employing an integrated-circuit sensor package as in FIGS. 1 and 1A. IC sensor package 10 included in motion detector 20 is positioned at the center of the field of view. The two windows 17 face forward and back. These windows define the frontal region F and rear region R of the motion detector field of view. Filling the void between the frontal and rear regions F and R are the lateral regions L lying on both sides of the IC package. Within each region will be zones of sensitivity alternating with dead zones in the manner well known from conventional PIR motion detectors with smaller fields of view. FIG. 2 is not intended to depict the details of the zones of sensitivity, but is only presented to delineate the motion detector's general area of coverage and the labeling of the various regions.

FIGS. 3 and 3A show an embodiment of a motion detector achieving the field of view pattern of FIG. 2. For clarity of exposition the motion detectors external housing is omitted from the figures so that selected components of the motion detector needed for the exposition below will be plainly visible.

Turning now to FIGS. 3 and 3A, IC sensor package 10 is mounted so that it is free to receive infrared radiation from the area in front of and behind the IC package where the windows 17 face. The motion detector includes two infrared-refracting means, which are indicated generally at reference numerals 21 and 22. These are inclined and disposed with respect to the front and rear surfaces of sensing elements 14a and b to direct radiation from the lateral areas 23 on the left and right sides of the IC package to the sensing element surfaces. In the embodiment of FIGS. 3 and 3A infrared-refracting means 21 and 22 each comprise an array of prisms 26a, 26b, and 27a, 27b, disposed on opposite sides of IC package 10 so that each array refracts radiation from a lateral area 23 on one side of the IC package to sensor 14. Because of the dead space at the lateral edges of IC package 10, the prism array on one side of package 10 is broken up into two separate subarrays 26a and 26b (respectively, 27a and 27b) disposed to the front and rear sides of IC package 10.

Each of the prism arrays 26a, 26b, 27a, 27b comprises a planar infrared-transmission substrate 28, in which a series of parallel, angled grooves 29 are formed. Each of the angled faces defining one of the grooves 29 forms a prism face. The substrates 28 are disposed so that infrared radiation, such as ray 31, impinging upon the back face of a substrate 28 from one of the lateral areas 23 passes through the substrate and is refracted to sensor 14 upon exiting an angled groove 29. (see FIG. 4.)

In general, the refracting means 21 and 22 are positioned to leave at least a portion of each sensor surface unobstructed so that infrared radiation may be directed at the unobstructed portions from the frontal and rear regions of the field of view without interference from the means 21 and 22. Refractive arrays 26a, 26b, 27a, 27b generally will extend vertically at least to the same level as the top of sensor 14. If the arrays extend too far forward or back, however, they may obstruct radiation aimed directly at sensor 14. If it is desirable for adequate lateral coverage to extend the arrays forward and back to such an extent, then the arrays may be configured to extend vertically only to a midportion of sensor 14, to the level indicated generally by reference line 31A across window 17 in FIG. 3. This arrangement leaves a portion of sensor 14 unobstructed to receive direct radiation from a greater angle.

The invention also includes a means, indicated generally at reference numeral 32, for focusing infra-red radiation from a plurality of zones in the frontal and rear regions F and R of the field of view directly toward the unobstructed portions of the sensing element surfaces and from both lateral regions L of the field of view to the infrared-refracting means 21 and 22 for refraction to the front and rear sensing element surfaces. Focusing means 32 is provided in the embodiment of FIGS. 3 and 3A by a segmented Fresnel lens array 33 defining a plurality of individual Fresnel lenslets 34, which direct radiation from well defined spatial zones in the field of view to the sensor, either directly or via refraction through refracting means 21 or 22. Lens array 33 is in the form of a cylinder surrounding IC package 10 and infrared-refracting means 21 and 22 as may be seen in FIG. 3A. The structure and operation of segmented Fresnel lenses is well known in the field of infrared motion detectors and thus need not be disclosed in any further detail here. Those skilled in the art of motion detector optics will appreciate that the benefits of the invention may be achieved with other focusing means besides the segmented Fresnel lens, although the Fresnel lens is advantageous for example because of its compactness, durability and low manufacturing cost.

The refracting prism arrays shown in FIGS. 3 and 3A are positioned close in to the IC package 10 and may have a size not much larger than the area of sensor window 17. An advantage of the close-in configuration is that the optical path of a ray of infrared radiation from a focusing element (i.e., a lenslet 34) directly to a window 17 is roughly the same, within tolerable limits, as the optical path to the window via refracting means 21 or 22. Because of this the focusing elements can be formed with the same focal length regardless of whether they focus the radiation on the sensing elements directly or via a refraction, and this allows for simpler and less expensive fabrication. Close-in configurations like this employing smaller refracting arrays are also desirable because they are generally easier to assemble and align.

When the invention is configured with small refracting arrays, the mounting for the arrays and for the IC package may be formed of a single unitary member indicated generally at 36 in FIG. 3. The outlying portions of member 36 define an array base 37 for the infrared-refracting means 21 and 22, and the central portion of member 36 defines an IC base 38 for holding IC package 10 containing the sensor. Member 36 is mounted on a mounting board (not shown) in the motion detector housing. The mounting board is typically provided by a printed circuit board although other types of mounting could also be used. Member 36 may be provided with mounting pegs for this purpose. Member 36 will have an appropriate aperture or apertures for the IC leads 15 to pass through to the mounting board.

It is important for proper operation of the motion detector that the infrared-refracting means be aligned correctly with the underlying sensor 14. IC base 38 of member 36 is formed to serve an indexing function assuring proper sensor alignment. Because of the unitary structure of member 36, i.e., of array base 37 and IC base 38, the single operation of inserting the IC package into IC base 38 automatically assures proper alignment of the refracting faces and the sensor. This simplifies the assembly process and leads to further savings in time and parts needed in mass production of the motion detectors.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, although the refractive arrays 26a, 26b, 27a, 27b illustrated here are formed with uniform grooves 29 having uniform slope, they may also be formed with a range of different slopes for refracting incident radiation through different angles depending upon the precise location where the radiation impinges on the array substrate. Various other configurations of refractive elements may also occur to those skilled in motion detector optics. Therefore, the invention is not to be limited to the above description and illustrations, but is defined by the appended claims.

What is claimed is:

1. A passive infrared motion detector having a field of view including frontal and rear regions in front of and behind the motion detector and lateral regions on both sides of the motion detector, comprising:

an integrated-circuit infrared sensor package containing an infrared sensor comprising at least one sensing element having front and rear surfaces responsive to incident infrared radiation, said at least one sensing element being mounted in said integrated circuit package to receive infrared radiation at said front and rear surfaces from the area in front of and behind said integrated-circuit package, respectively;

first and second infrared-refracting means disposed with respect to said front and rear surfaces to direct radiation from lateral areas on both sides of said integrated-circuit package to said surfaces, wherein said first and second refracting means are positioned to leave at least a portion of each said surface unobstructed for receiving infrared radiation directed at said respective unobstructed portions from the frontal and rear regions of the field of view; and focusing means structured and arranged to direct infrared radiation from a plurality of zones in the frontal and rear regions of said field of view directly to said unobstructed portions of said surfaces and from both lateral regions of said field of view to said first and second refracting means for refraction to said front and rear surfaces, whereby the motion detector is provided with a field of view encompassing up to 360°.

2. The motion detector of claim 1 wherein said first and second infrared-refracting means comprise first and second arrays of prisms disposed on opposite sides of said integrated-circuit package so that each said array refracts radiation from a said lateral area on one side of said integrated-circuit package to said at least one sensing element.

3. The motion detector of claim 2 wherein each said prism array comprises at least one planar infrared-transmissive substrate having a series of parallel, angled grooves formed therein and disposed to receive infrared radiation from one of said lateral regions and to refract the received radiation through said angled grooves to said at least one sensing element.

4. The motion detector of claim 3 wherein each said prism array comprises first and second planar infrared-transmissive substrates having a series of parallel, angled grooves formed therein, the first and second substrates of each said array being disposed, respectively, to the front and to the rear of said integrated-circuit package.

5. The motion detector of claim 3, further comprising:

a member having a first base portion for receiving and holding said first and second prism arrays and a second base portion for receiving and holding said integrated-circuit package in fixed position for maintaining said front and rear surfaces of said at least one sensing element in fixed relation to said prism arrays.

* * * * *